United States Patent
Wang

(10) Patent No.: US 8,059,191 B2
(45) Date of Patent: Nov. 15, 2011

(54) METHOD FOR SHUTTING DOWN A TIMING GENERATING UNIT, A METHOD FOR SHUTTING DOWN A DIGITAL IMAGE-CAPTURING DEVICE, AND A DIGITAL IMAGE-CAPTURING DEVICE

(75) Inventor: Chun-Chang Wang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 393 days.

(21) Appl. No.: 12/453,896

(22) Filed: May 27, 2009

(65) Prior Publication Data

US 2010/0231739 A1 Sep. 16, 2010

(30) Foreign Application Priority Data

Mar. 16, 2009 (TW) ............................ 98108371 A

(51) Int. Cl.
*H04N 5/225* (2006.01)
*H04N 3/14* (2006.01)
*H04N 5/335* (2006.01)
*G03B 7/26* (2006.01)
(52) U.S. Cl. .................. 348/372; 348/312; 396/301
(58) Field of Classification Search .............. 348/312, 348/372
See application file for complete search history.

(56) References Cited

U.S. PATENT DOCUMENTS

| | | | | |
|---|---|---|---|---|
| 5,225,958 A | * | 7/1993 | Nakamura | 348/76 |
| 5,777,508 A | * | 7/1998 | Sawanobori | 348/312 |
| 5,822,596 A | * | 10/1998 | Casal et al. | 713/322 |
| 6,856,352 B1 | * | 2/2005 | Kijima | 348/372 |
| 7,046,293 B1 | * | 5/2006 | Nagase | 348/372 |
| 7,830,448 B2 | * | 11/2010 | Kashiwagi | 348/372 |
| 2004/0165104 A1 | * | 8/2004 | Takami | 348/372 |
| 2007/0146492 A1 | * | 6/2007 | Choi | 348/211.99 |
| 2008/0093534 A1 | * | 4/2008 | Mheen et al. | 250/214 C |
| 2008/0143869 A1 | * | 6/2008 | Kashiwagi | 348/372 |
| 2010/0208111 A1 | * | 8/2010 | Wang | 348/294 |

FOREIGN PATENT DOCUMENTS

JP 2008148191 A * 6/2008
JP 2009177866 A * 8/2009

* cited by examiner

*Primary Examiner* — John Villecco
(74) *Attorney, Agent, or Firm* — Rosenberg, Klein & Lee

(57) ABSTRACT

A method for shutting down a digital image capturing device is provided, The steps of the method are as follows: first, outputting a reset signal from a control unit of the capturing device to a timing generating unit; then setting a vertical pulse signal of the timing generating unit to a ground level within a time frame of the timing generating unit outputting a horizontal blanking signal; lastly, automatically shutting down the timing generating unit.

19 Claims, 3 Drawing Sheets

METHOD FOR SHUTTING DOWN A TIMING GENERATING UNIT, A METHOD FOR SHUTTING DOWN A DIGITAL IMAGE-CAPTURING DEVICE, AND A DIGITAL IMAGE-CAPTURING DEVICE

BACKGROUND OF THE INVENTION

1. Field of the Invention

The present invention relates to a capturing device and a method for shutting down; in particular to a method for shutting down a timing generating unit, a method for shutting down a digital image-capturing device, and a digital image-capturing device.

2. Description of Related Art

Digital image-capturing device (such as a digital camera) provides a fast and convenient way for a user to take pictures, but as various digital image-capturing device becomes more common, users are becoming more particular over the requirement and functions of these digital image-capturing devices. For example FIG. 1 is a function block diagram of a digital image-capturing device according to the prior art, which has the following shut down procedures:

First, once the control unit 90 receives the message that the digital image-capturing device 9 is shutting down, then the control unit 90 outputs a signal so as to shut down the timing generating unit 92. Therein, from the point of view of the timing generating unit 92, it immediately shuts down upon receiving the signal from the control unit 90. Therefore at this time, under normal condition, the driving unit 94 is no longer able to receive the pulse signal for the driving operation of the imaging device 96 (such as a CCD or a CMOS) from the timing generating unit 92. The end result is that the imaging device 96 can be successfully shut down without damage from the pulse signal.

However under certain circumstances, such as shown by FIG. 2, damages may occur to the imaging device 96. Therein, when the control unit 90 outputs a signal at time Ti for controlling the shut down of the timing generating unit 92, then the timing generating unit 92 shuts down immediately, however the vertical pulse (V_Pulse) signal being output by the timing generating unit 92 is at the highest voltage level. Therefore, although the timing generating unit 92 is being shut down, the voltage level of the vertical pulse signal output by the timing generating unit is still retained at a high voltage level. Furthermore, at this time T1, the shutting down of the voltage VH/VL that is used for the operation of the imaging device 96 also occurs, yet because the discharge time for this voltage VH/VL is not fixed, therefore the shut down is not immediately, and the end result is that the retained high voltage level from the timing generating unit 92 may cause damages to the imaging device 96 through the driving unit 94.

Therefore the conventional method of shutting down the digital image-capturing device 9, is primarily through the control unit 90 controlling the time of shut down for the timing generating unit 92, however from the point of view of the control unit 90 there is no information regarding operation status of the timing generating unit 92 at this time of shut down. For example, the control unit 90 cannot determine whether or not the vertical pulse signal output by the timing generating unit 92 is at a high voltage level; so that when shutting down, it is very likely for the imaging device 96 to receive the high voltage retained from abnormal shut down of the timing generating unit 92, and thereby damaging the service lifespan of the imaging device 96. Therefore, how to provide protection for the imaging device 96 from damage is an issue that needs to be resolved.

SUMMARY OF THE INVENTION

In view of the aforementioned issues, the present invention provides a method for shutting down a timing generating unit, a method for shutting down a digital image-capturing device, and the digital image-capturing device thereof, so that the timing generating unit itself can automatically control the time period for shutting down, and thereby solving the issues of the prior art.

In order to achieve the aforementioned objectives, a method for shutting down a timing generating unit is provided according to an embodiment of the present invention. Therein the method is used for providing a pulse signal that is required for the operation of an imaging device, and the steps of the method includes: first, when a reset signal has been received, then within a time frame of the timing generating unit outputting a horizontal blanking signal, setting a vertical pulse signal to a ground level; and then the timing generating unit automatically performs shut down.

In order to achieve the aforementioned objectives, a method for shutting down a digital image-capturing device is provided according to another embodiment of the present invention, the steps of the method comprising: when the digital image-capturing device is shutting down, a control unit of the digital image-capturing device outputs a reset signal to a timing generating unit, wherein the timing generating unit is for providing a pulse signal that is required for the operation of an imaging device of the digital image-capturing device; then according to the reset signal that is received by the timing generating unit, within the time frame of the timing generating unit outputting a horizontal blanking signal, setting a vertical pulse signal to a ground level; and then the timing generating unit automatically performs shut down.

In order to achieve the aforementioned objectives, a digital image-capturing device is provided according to yet another embodiment of the present invention, the device includes: a control unit, an imaging device, and a timing generating unit. Therein, the control unit is for controlling the operation of the digital image-capturing device; the imaging device is coupled to the control unit, for providing image capture; and the timing generating unit has an automatic shut down module, the timing generating unit is for providing a pulse signal required for the operation of the imaging device. Therein, the control unit outputs a reset signal to the automatic shut down module when the digital image-capturing device is shutting down, so that the automatic shut down module after receiving the reset signal, within the time frame of the timing generating unit outputting a horizontal blanking signal, first sets a vertical pulse signal to a ground level, then automatically shuts down the operation of the timing generating unit.

Therefore through the aforementioned technical proposal of the present invention, the following efficacy is achieved: once the timing generating unit has received the reset signal, via determining whether or not the timing generating unit is at the stage of outputting the horizontal blanking signal, the timing generating unit may further determine whether or not to set a vertical pulse signal to a ground level, then performs shut down. Thereby the timing generating unit of the present invention can automatically controls the time of the shut down, furthermore the vertical pulse signal may be set as a safety level, thereby preventing the imaging device from damages of high voltage level, and subsequently achieves the effects of protection.

In order to further understand the techniques, means, and effects the present invention takes for achieving the prescribed objectives, the following detailed descriptions and appended drawings are hereby referred, such that, through which, the purposes, features, and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Due to the fact that the required pulse signal provided by the timing generating unit for the operation of the imaging device is of high voltage level, meaning that the vertical pulse signal output by the timing generating unit is of high voltage level, therefore in order to successfully and safely shut down the imaging device, the output voltage level of the vertical pulse signal of the timing generating unit must be set to a safe level (such as being set to a ground level). In view of the aforementioned reason, the present invention provides a method for shutting down a timing generating unit, a method for shutting down a digital image-capturing device, and a digital image-capturing device thereof, so that the timing generating unit can automatically set the output level of the vertical pulse signal to a safe level then automatically shuts down. Thereby the present invention prevents the imaging device from the condition of being damage due to receiving voltage of high level while shutting down. The following merely discloses the necessary structures and operations for explanation, however, for those skilled in the art, embodiments other than those described below are still obviously included, and therefore the present invention should not be limited to those embodiments disclosed below.

Figure 3:
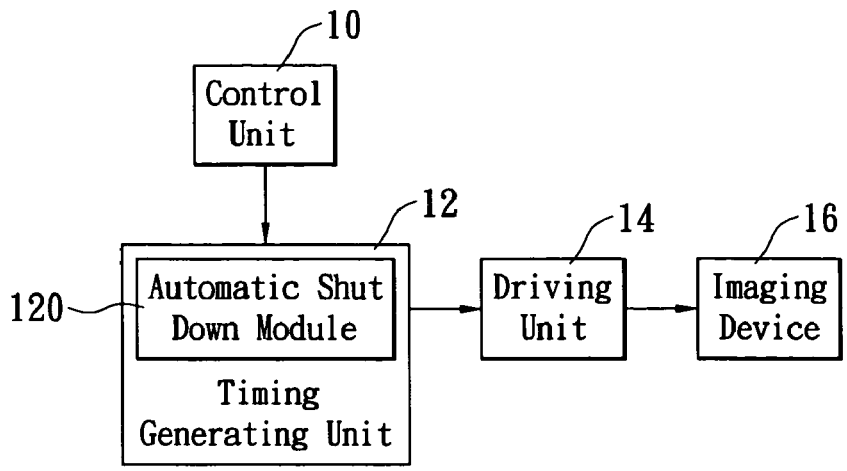
FIG. 3 is a function block diagram of a digital image-capturing device as according to a preferred embodiment of the present invention.

First please refer to FIG. 3, wherein the digital image-capturing device 1 of FIG. 3 is primarily for capturing image input. The digital image-capturing device 1 includes a control unit 10, a timing generating unit 12, a driving unit 14, and an imaging device 16. The control unit 16 is the control core for the digital image-capturing device 1 and may control the overall operation of the digital image-capturing device 1. The timing generating unit 12 is coupled to the control unit 10, and is primarily for outputting the required pulse signal (such as a vertical pulse signal V_pulse and a horizontal pulse signal H_pulse) for the operation of the imaging device 16. The driving unit 14 is coupled to the timing generating unit 12, for driving the imaging device 16 according to the pulse signal output by the timing generating unit 12. Specifically, the imaging device 16 is an image detection device composed from components such as a charge coupled device (CCD) or a complementary metal-oxide-semiconductor (CMOS). In the present embodiment, the digital image-capturing device 1 is a device with digital camera function.

In terms of the timing generating unit 12, the interior of which is further installed with an automatic shut down module 120. The primary function of the automatic shut down module 120 is so that the timing generating unit 120 may automatically shut down, and also so that the vertical pulse signal and the horizontal pulse signal may be set to a safe preset level, wherein in the present embodiment the preset level is the ground level. More specifically, once the automatic shut down module 120 receives a reset signal output by the control unit 10, then automatically activates a shut down procedure; wherein the shut down procedure, while within a time frame of the timing generating unit 12 outputting a horizontal blanking signal, sets the vertical pulse signal and the horizontal pulse signal to a ground level, then automatically shuts down the operation of the timing generating unit 12.

Figure 4A:
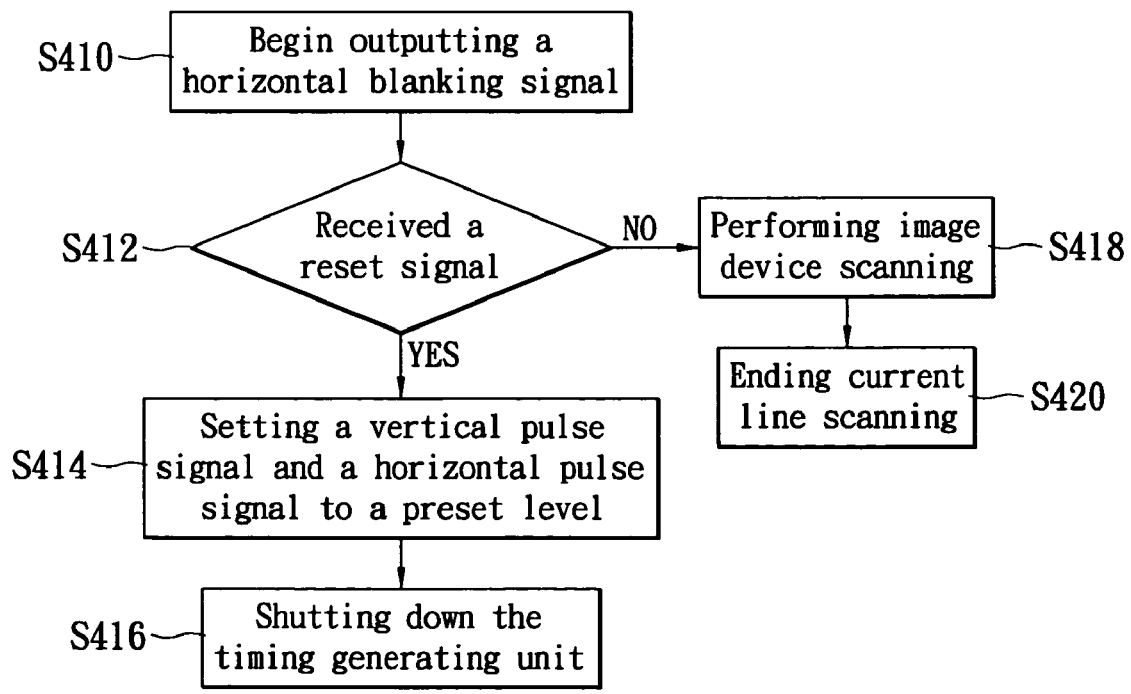
FIG. 4A is an operation control flow chart of a timing generating unit according to the present invention.
Figure 4B:
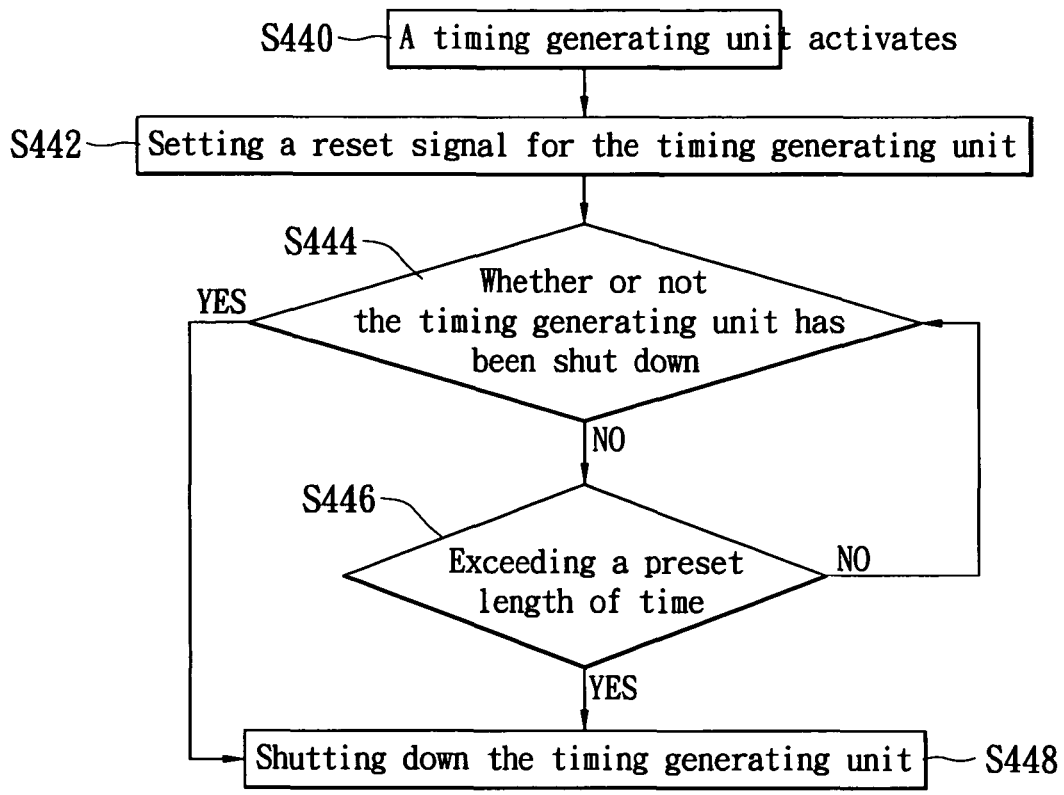
FIG. 4B is an operation control flow chart of a control unit according to the present invention.

Next, the operation control way for the timing generating unit 12 and the control unit 10 can be respectively reference to FIGS. 4A and 4B. Here below is an explanation under the condition that digital image-capturing device 1 has been activated.

First, starting with the operation control way of the timing generating unit 12 as shown in FIG. 4A, the steps include:

Once the timing generating unit 12 being outputting a horizontal blanking signal for the scanning of a line scan of the imaging device 16 (Step S410); then the automatic shut down module 120 determines whether or not a reset signal output by the control unit 10 has been received (Step S412); if the determination is yes, then the automatic shut down module 120 sets the vertical pulse signal and the horizontal pulse signal output by the timing generating unit 12 to a preset level (Step S414), wherein as an example the preset level may be the ground level; and then the timing generating unit automatically performs operation shut down (Step 416).

If the determination in Step S412 is no, then this means that at this time the timing generating unit 12 has not been requested for automatic shut down, so that all operations is to remain normal, and driving of scanning for the imaging device 16 continues (Step 418); then complete and end the operation on current line scanning (Step 420), and subsequently continue with the scanning operation for the next line, wherein when the line scanning operation of the next line reaches the part where horizontal blanking signal occurs, then the operation control way of the timing generating unit 12 as shown in FIG. 4A repeats. Thereby the operation control way of FIG. 4A keeps repeating, until the timing generating unit 12 receives a reset signal output by the control unit 10.

What needs to be emphasized here is that although Step S412 of FIG. 4A is performed within the time frame when the horizontal blanking signal is being output by the timing generating unit 12; however the step S412 may also be performed within the overall activating operation time frame of the timing generating unit 12, and only once the determination in Step S412 is yes, then would the vertical pulse signal be set to the ground level, and the setting is within the time frame of the timing generating unit 12 outputting a horizontal blanking signal. In other words, according to the reset signal that is received by the timing generating unit 12, within the time frame of the timing generating unit 12 outputting a horizontal blanking signal, the timing generating unit 12 sets a vertical pulse signal to a ground level.

Next, please refer to FIG. 4B for the operation control way of the control unit 10, the steps are as follows:

When the timing generating unit 12 has been activated for operation (Step S440); then the control unit 10 sets a reset signal to a reset pin of the timing generating unit 12 (Step S442), and the reset signal of the preset embodiment is for shutting down the timing generating unit 12. Next, determine whether or not the timing generating unit 12 has been shut down (Step S444), wherein the control unit 10 can determine whether or not the timing generating unit 12 has been shut down according to the voltage level of an enabler pin of the timing generating unit 12. For example, the enabler pin of the timing generating unit 12 being high and low respectively corresponds to the activation and shutting down of the operation of the timing generating unit 12. Thereby when the control unit 10 detects that the enabler pin of the timing generating unit 12 being low, then the determination is made that the timing generating unit 12 has been shut down.

When the determination in Step S444 is no, then the control unit 10 further determines if the shut down time for the timing generating unit 12 exceeds a preset length of time (Step S446), wherein the overall shut down time for the timing generating unit 12 is measured starting with the completion of setting in Step S442.

When the determination in step S446 is yes, then this means that the timing generating unit 12 has not successfully shut down within the preset time, the reason may be that the timing generating unit 12 has stalled or malfunctioned so that the successful shut down cannot be completed, therefore the control unit 10 then actively shuts down the timing generating unit 12 (Step 448). For example, the control unit 10 may output a signal so that the enabler pin of the timing generating unit 12 changes to low.

On the other hand, if the determination in step S444 is yes, then in order to prevent erroneous determination result, the control unit 10 may still continue to perform the aforementioned step S448, so as to ensure that the timing generating unit 12 is shut down.

Next a digital camera is used as an example for explaining the actual operation process for the digital image-capturing device according to an embodiment of the present invention. Please refer to FIG. 5, wherein the VH/VL is the voltage for the operation of the imaging device 16, V-Node represents the vertical pulse signal received by all the vertical scan lines of the imaging device 16, and H-pulse represents the horizontal pulse signal received by all the horizontal scan lines of the imaging device 16.

Figure 5:
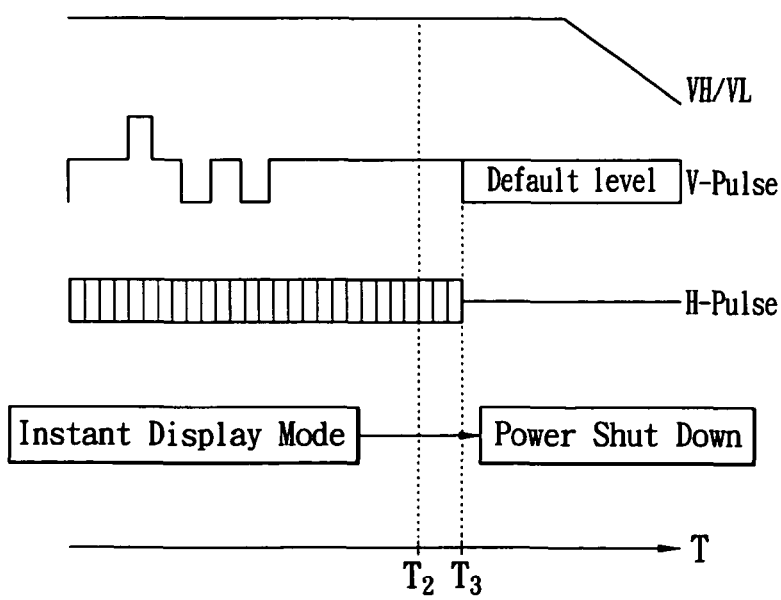
FIG. 5 is a shut down timing diagram of the digital image-capturing device according to the present invention.

Time T2 of FIG. 5 show the time point when power down begins for the digital camera, thereby the control unit 10 outputs a reset signal at Time T2 to the timing generating unit 12, so that the digital camera switches from LiveView display mode to the power down stage. At time T3 the timing generating unit 12 outputs a horizontal blanking signal, and because the timing generating unit 12 has already received the reset signal in Time T2, therefore a shut down procedure may be performed, so that the output voltage level of the vertical pulse signal and the output voltage level of the horizontal pulse signal is set to a preset level, wherein for the present embodiment the present level is the ground level; subsequently the timing generating unit 12 can be shut down. After time T3, due to the fact that the output voltage level for the vertical pulse signal and the output voltage level for the horizontal pulse signal is now at the ground level, therefore the timing generating unit 12 is no longer able to drive the imaging device 16 through the driving unit 14, thereby the protection effect for the imaging device 16 is achieved.

Figure 1:
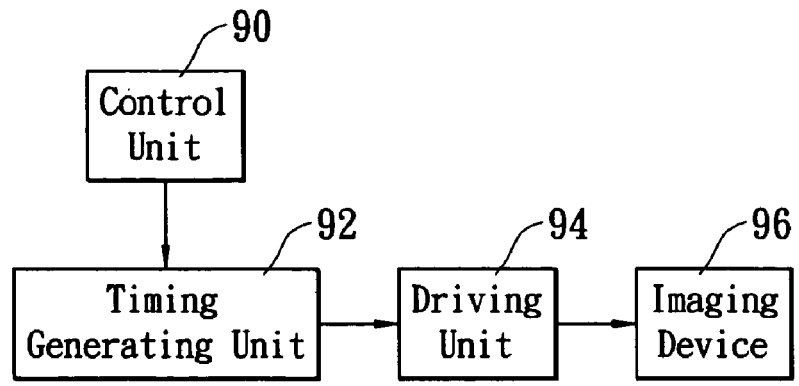
FIG. 1 is a function block diagram of a digital image-capturing device according to the prior art.
Figure 2:
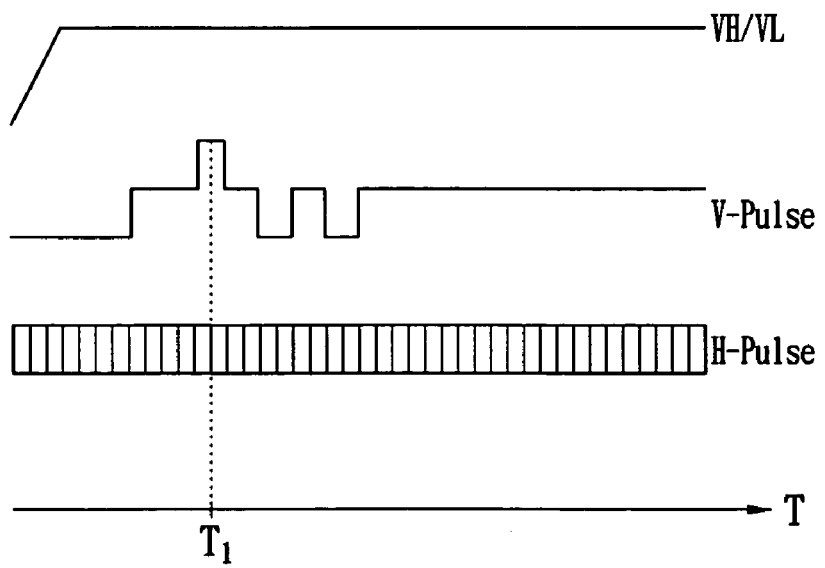
FIG. 2 is a shut down timing diagram of the digital image-capturing device in FIG. 1 according to the prior art.

As per the aforementioned embodiments, it is noted that the technical effect of the present invention is that the timing generating unit 12 may self regulate the shut down time, which when compared with the prior art (see FIG. 1) that has the control unit 90 for determining the shut down time of the timing generating unit 92, the two are clearly different in terms of technique. Furthermore the time point for when the present invention shuts down the timing generating unit 12 is within the time frame of the timing generating unit outputting a horizontal blanking signal, therefore this ensures that the timing generating unit 12 can output a complete pulse signal for the scanned line, and the shut down time of the timing generating unit 12 can be controlled to be within the operation time for a scan line output. Additionally, within the output time frame of the horizontal blanking signal, the present invention sets the output voltage level of the vertical pulse signal and the output voltage level of the horizontal pulse signal to the ground level, so that the timing generating unit 12 after shutting down does not have high voltage level remain at the pins for the vertical pulse signal and the horizontal pulse signal. Thereby the imaging device 16 does not suffer damage from abnormal high voltage after the shutting down of the timing generating unit 12.

Furthermore, although the automatic shut down procedure for the timing generating unit 12 according to the aforementioned embodiments have both the output voltage level of the vertical pulse signal and the output voltage level of the horizontal pulse signal being set to the ground level. Yet because between the two output voltage levels only the vertical pulse signal may output high voltage level and thereby cause damage to the imaging device 16, therefore in another embodiment of the present invention, the automatic shut down procedure for the timing generating unit 12 may also merely sets the vertical pulse signal to the ground level, and via this way the protection affect for the imaging device 16 during the shutting down of the digital image-capturing device is still achieved.

The aforementioned descriptions represent merely the preferred embodiment of the present invention, without any intention to limit the scope of the present invention thereto. Various equivalent changes, alternations, or modifications based on the claims of present invention are all consequently viewed as being embraced by the scope of the present invention.

What is claimed is:

1. A method for shutting down a timing generating unit, used for providing a pulse signal that is required for the operation of an imaging device, the steps of the method comprising:
setting a vertical pulse signal to a ground level when a reset signal has been received, and the setting is within a time frame of the timing generating unit outputting a horizontal blanking signal; and
automatically shutting down the timing generating unit.

2. The method according to claim 1, before the step of having received the reset signal, further comprising the following step:
determining whether or not the reset signal has been received when the timing generating unit has been activated.

3. The method according to claim 2, wherein the step of determining whether or not the reset signal has been received is performed within the time frame of the timing generating unit outputting the horizontal blanking signal.

4. The method according to claim 2, wherein the step of determining whether or not the reset signal has been received is performed within the overall activating operation time of the timing generating unit.

5. The method according to claim 1, wherein in addition to setting the vertical pulse signal to the ground level, further setting a horizontal pulse signal to the ground level.

6. A method for shutting down a digital image-capturing device, the steps of the method comprising:

outputting a reset signal to a timing generating unit via a control unit of the digital image-capturing device when the digital image-capturing device is shutting down, wherein the timing generating unit is for providing a pulse signal that is required for the operation of an imaging device of the digital image-capturing device;

setting a vertical pulse signal to a ground level, wherein the setting is according to the reset signal that is received by the timing generating unit, and is within a time frame of the timing generating unit outputting a horizontal blanking signal; and automatically shutting down the timing generating unit.

7. The method according to claim 6, before the step of having the timing generating unit receive the reset signal, further comprising the following step:

determining whether or not the reset signal has been received via the timing generating unit, wherein the determining occurs when the timing generating unit has been activated.

8. The method according to claim 7, wherein the step of determining whether or not the reset signal has been received is performed within the time frame of the timing generating unit outputting the horizontal blanking signal.

9. The method according to claim 7, wherein the step of determining whether or not the rest signal has been received is performed within the overall activating operation time of the timing generating unit.

10. The method according to claim 6, further comprising the following step:

determining whether or not the timing generating unit has been shut down via the control unit.

11. The method according to claim 10, wherein the control unit determines whether or not the timing generating unit has been shut down within a preset time.

12. The method according to claim 11, if the timing generating unit did not shut down within the preset time, then the control unit directly controls and performs the shut down for the timing generating unit.

13. The method according to claim 6, wherein in addition to setting the vertical pulse signal to the ground level, further setting a horizontal pulse signal to the ground level.

14. A digital image-capturing device, comprising:

a control unit, for controlling the operation of the digital image-capturing device;

an imaging device, coupled to the control unit, for providing image capture; and a timing generating unit, with an automatic shut down module, the timing generating unit is for providing a pulse signal required for the operation of the imaging device;

wherein the control unit outputs a reset signal to the automatic shut down module when the digital image-capturing device is shutting down, so that the automatic shut down module after receiving the reset signal, within a time frame of the timing generating unit outputting a horizontal blanking signal, sets a vertical pulse signal to a ground level, then automatically shuts down the operation of the timing generating unit.

15. The device according to claim 14, wherein the control unit after outputting the reset signal to the timing generating unit, determines whether or not the timing generating unit has been shut down.

16. The device according to claim 15, wherein the control unit determines whether or not he timing generating unit has been shut down within a preset time.

17. The device according to claim 16, if the timing generating unit did not shut down within the preset time, then the control unit directly controls and performs the shut down for the timing generating unit.

18. The device according to claim 14, wherein in addition to setting the vertical pulse signal to the ground level, further setting a horizontal pulse signal to the ground level.

19. The device according to claim 14, further comprising:

a driving unit, coupled to the timing generating unit, for driving the imaging device according to the pulse signal output by the timing generating unit.

* * * * *